United States Patent [19]

Laundy

[11] 4,082,325
[45] Apr. 4, 1978

[54] COUPLING DEVICE FOR CONNECTING A PLURALITY OF PORTS TO ONE PIPE

[75] Inventor: James R. Laundy, Racine, Wis.

[73] Assignee: Tenneco Inc., Racine, Wis.

[21] Appl. No.: 683,560

[22] Filed: May 5, 1976

[51] Int. Cl.² ............................................. F16L 41/00
[52] U.S. Cl. ................................. 285/155; 29/157.6;
113/116 UT; 285/286; 285/424
[58] Field of Search ............... 285/155, 131, 176, 132,
285/424, 157, 286; 29/157 R, 157.5, 157.6;
113/116 UT

[56] References Cited

U.S. PATENT DOCUMENTS

| 862,649 | 8/1907 | Mower | 285/155 |
| 3,206,836 | 9/1965 | Schlussler | 285/155 X |
| 3,275,346 | 9/1966 | Gregg | 285/416 X |

FOREIGN PATENT DOCUMENTS

| 719,208 | 11/1931 | France | 285/155 |
| 1,115,960 | 6/1968 | United Kingdom | 285/416 |

Primary Examiner—Dave W. Arola
Attorney, Agent, or Firm—Harness, Dickey & Pierce

[57] ABSTRACT

A coupling device for connecting two ports to one pipe comprises a one piece metal cup drawn to a special shape that receives a mounting flange at one end for securing it over at least two ports and a pipe engaging collar at the other end and is of a construction such that the collar can be disposed at various angles. The device is formed to its special final shape by pressing an axial portion thereof around two mandrels by means of pressure applied transversely to its longitudinal axis.

7 Claims, 22 Drawing Figures

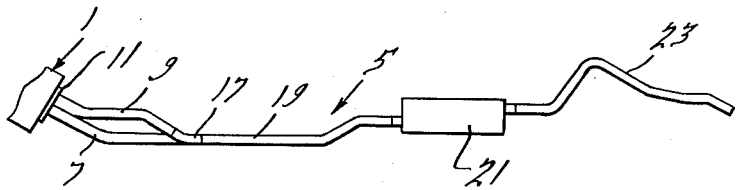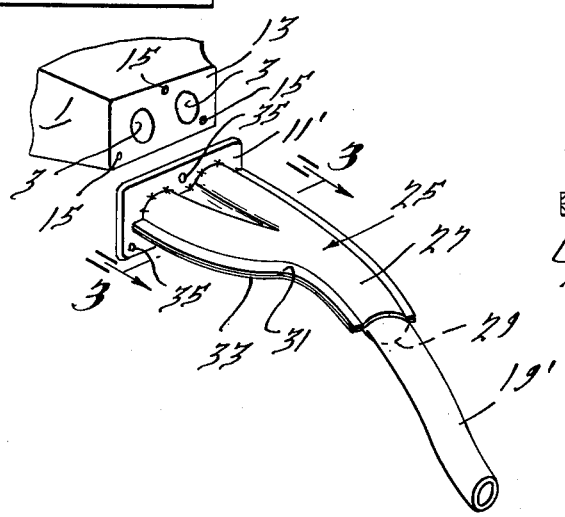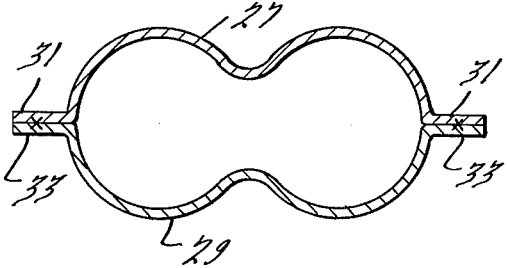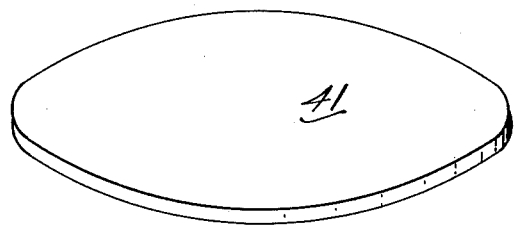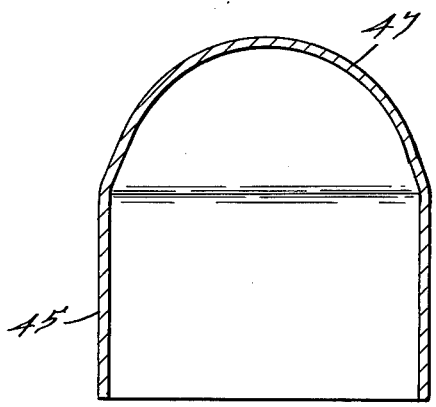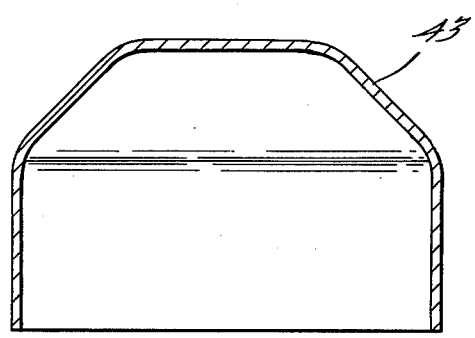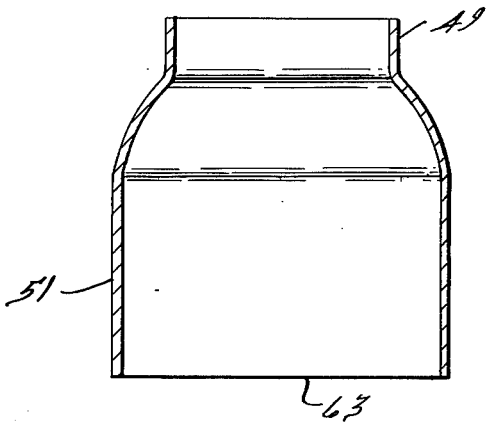

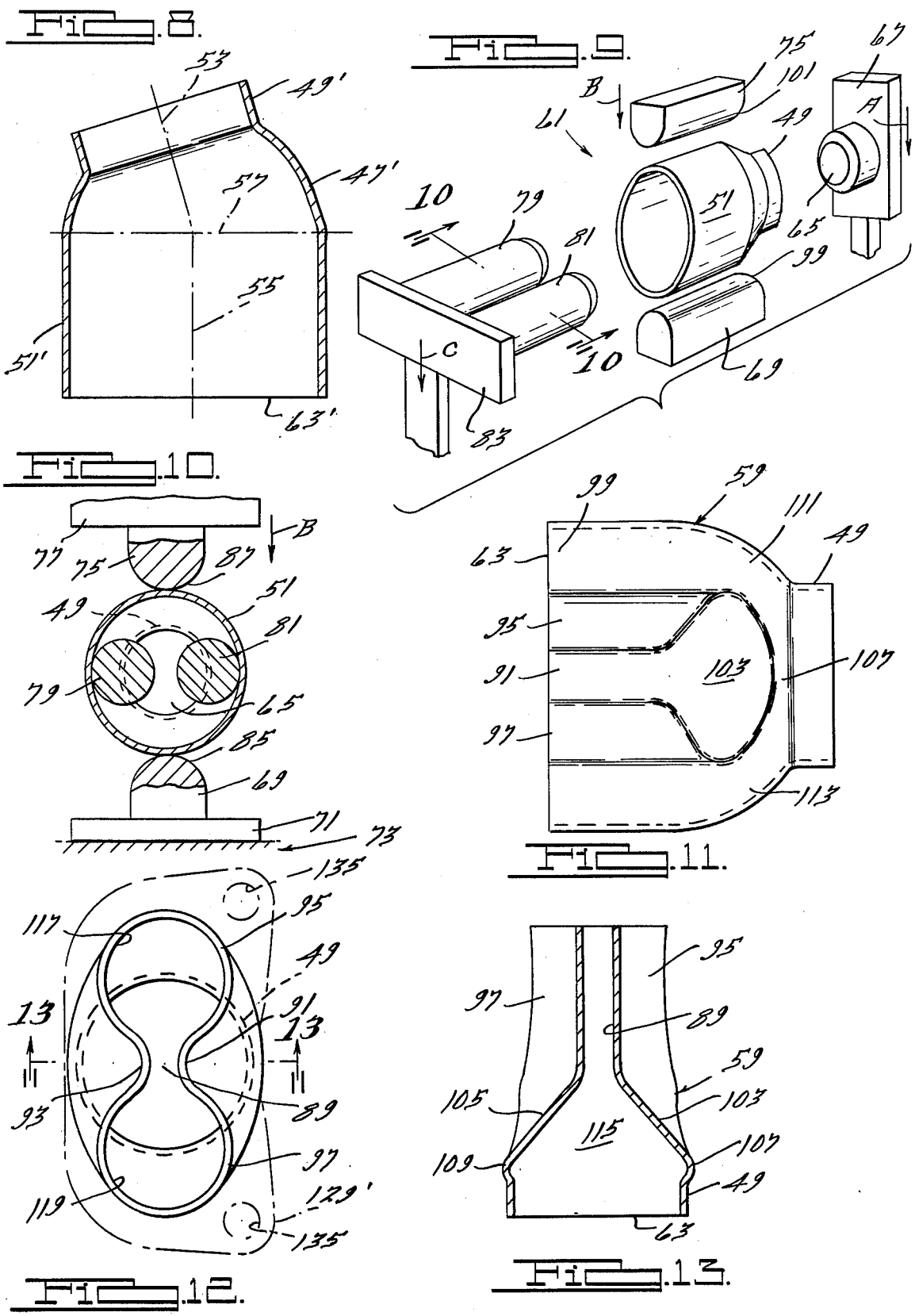

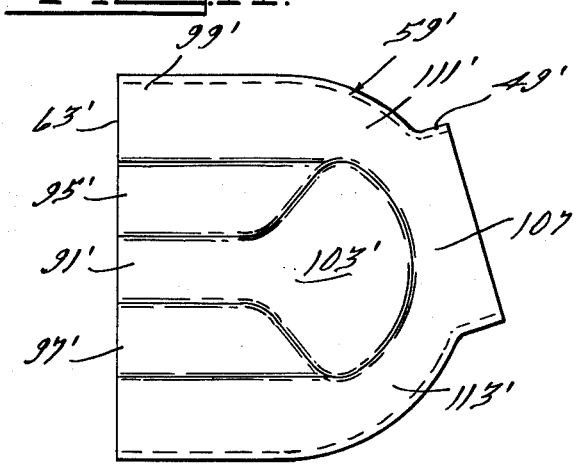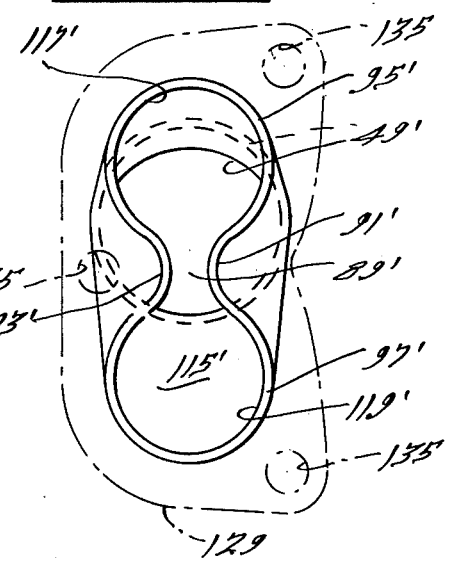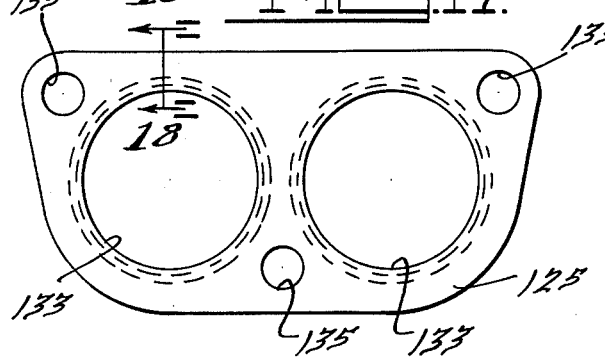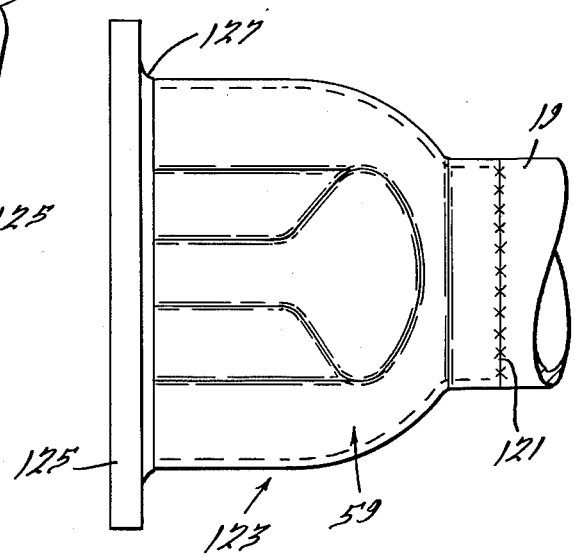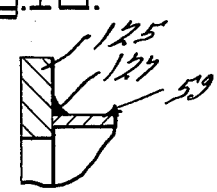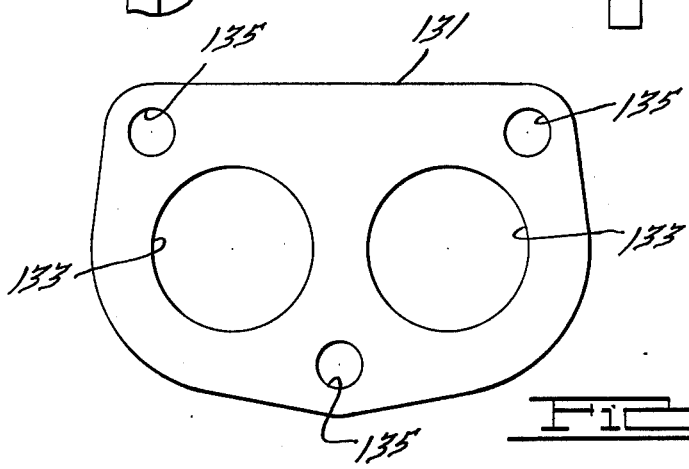

COUPLING DEVICE FOR CONNECTING A PLURALITY OF PORTS TO ONE PIPE

GENERAL BACKGROUND OF THE INVENTION

Quite a few automobiles currently manufactured in countries other than the United States, most of which have four cylinder engines, have exhaust gas systems in which one conduit is used to carry the gas emitted from two exhaust gas ports in the engine. These ports are often close to each other but it is still common practice to use two pipes to conduct the gas from the two ports to the one exhaust gas conduit, though there is a rather expensive clam shell type of adapter arrangement that has been conceived for directly connecting the one conduit to the two ports.

SUMMARY OF THE INVENTION

It is the purpose of this invention to provide a practical coupling device for connecting two or more ports to one conduit which is designed so that it may be readily made to suit various angles of connection to the one conduit. It is also a purpose of this invention to provide a method for making such a coupling device.

The invention accomplishes this purpose by means of a coupling device which includes a mounting flange to be bolted to the engine and a novel one piece metal body which is shaped at one end into an inlet port that covers a plurality of ports and receives gas from them and at its other end to have an oulet port for connection to a single gas conduit. The structure is such that the orientation of the outlet port may be easily changed from one body to another without changing the structure of the tools required to finally shape the body.

According to the presently preferred method of manufacture, the body is made by drawing a round flat blank into a circular, cylindrical round bottomed cup, and then piercing the round bottom and preferably shaping or extruding a part of it into a collar to form the outlet port which is disposed to be either coaxial with the other (or inlet) end of the cup or to extend at a desired angle to it. At this stage, except for the bottom, the body is still circular, cylindrical, and of uniform diameter. This part of the body is then slipped to a desired depth over a pair of relatively small uniform diameter, separated mandrels whose overall width is substantially the same as that of the cylindrical part of the body. A convex ram and die arrangement is then applied to opposite sides of the body between the mandrels to shape the inlet and an adjacent part of the body length around a portion of each mandrel to form the final inlet port. During this operation a mandrel is inserted in the outlet collar to hold it in the desired position relative to the axis of the shell.

DESCRIPTION OF THE DRAWINGS

FIG. 1 is a side elevation of a most common type of prior art exhaust system for an automobile manufactured outside the United States having a four cylinder engine (partly shown) with two closely adjacent exhaust ports;

FIG. 2 is an exploded perspective view, on an enlarged scale as compared with FIG. 1, for the inlet end of another and much less common (because of its expense) type of prior art replacement exhaust system;

FIG. 3 is an enlarged cross section along the line 3-3 of FIG. 2;

FIG. 4 is a perspective view of a flat, circular metal blank that serves as a starting point in the manufacture of the coupling device of the present invention;

FIG. 5 is an axial cross section through a first draw cup that is formed from the blank of FIG. 4 in accordance with the invention;

FIG. 6 is an axial cross section through a cup that is formed as the next stage after the first draw cup of FIG. 5, as a result of a second draw and trim, and providing the basic shell or body from which the coupling device of the invention is eventually formed;

FIG. 7 is an axial cross section through the shell or cup after the next stage of manufacture wherein the bottom of the basic shell has been pierced and extruded to form an outlet port that is coaxial with the shell;

FIG. 8 is a view similar to that of FIG. 7 but shows a skewed outlet port which extends at a desired angle (16° in this case) to the axis of the basic shell instead of a coaxial port as in FIG. 7;

FIG. 9 is a perspective, schematic, exploded view of manufacturing equipment that is used to change the shape of the shells of either FIGS. 7 or 8 into the desired final shape for practice of the invention;

FIG. 10 is a view of the equipment of FIG. 9 as taken from a plane 10—10 in FIG. 9 but modified somewhat and showing the mandrels in place in the shell and the ram and die in contact with the shell just prior to the application of forming pressure;

FIG. 11 is a plan view of the completed body after it has been subjected to the action of the equipment of FIGS. 9 and 10;

FIG. 12 is an end view taken from the left of FIG. 11 with a mounting flange outline shown in phantom lines;

FIG. 13 is a cross section of the completed body as taken along the line 13—13 of FIG. 12;

FIG. 14 is a plan view of a completed body, similar to the view of FIG. 11, but showing the skewed outlet port as in the shell of FIG. 8;

FIG. 15 is an end elevation taken from the left of FIG. 14 with a mounting flange outline shown in phantom lines;

FIG. 16 is a plan view of a coupling device according to the invention including the body as shown in FIG. 11 plus a mounting flange welded thereto;

FIG. 17 is an end elevation taken from the left of FIG. 16;

FIG. 18 is a cross section as taken along line 18—18 of FIG. 17;

FIG. 19 is a plan view of a modified flange shape that could be used with the coupling device of FIGS. 16 and 17 instead of the flange shown therein;

DETAILED BACKGROUND OF THE INVENTION

Figure 20:
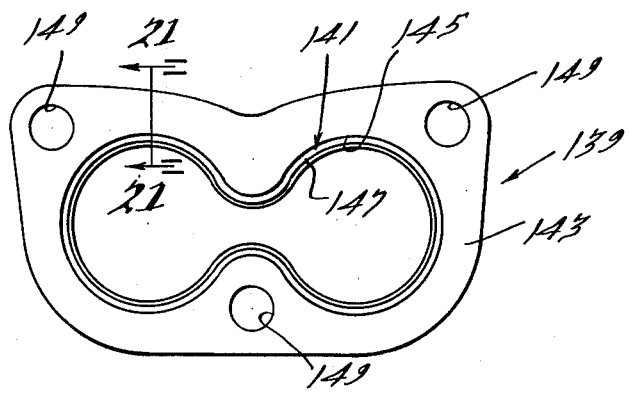
FIG. 20 is an end elevation similar to FIG. 17 but showing a different flange construction and a different interconnection between the body and flange.

Referring to FIGS. 1-3, a small internal combustion engine schematically shown at 1 has a pair of exhaust ports 3 that are spaced close to each other as seen in FIG. 3. This is a rather common exhaust port arrangement in engines, primarily with four but some with six cylinders, manufactured for and installed in small automobiles made outside the United States. The most common general exhaust system arrangement for such engines is shown at 5 in FIG. 1 wherein each port 3 exhausts into its own individual conduit, as seen at 7 and 9, the ends of these conduits being welded to a common flange 11 that is sealed and bolted against the face 13 of the engine by means of bolts (not shown) that thread into the three holes 15, The exhaust conduits 7 and 9 are joined together in a Y joint at 17 so that the exhaust gas flows through a single conduit 19 to the muffler (or catalytic converter) 21 and from the muffler the exhaust gas flows through tailpipe 23 to atmosphere. In the United States exhaust systems of the type illustrated in FIG. 1, having various specific components as required for each particular automobile and model, are sold as replacement exhaust systems.

The use of the two exhaust conduits 7 and 9 adds cost and weight to the exhaust system 7 and in a few systems they are replaced by a clamshell type adapter 25 shown in FIGS. 2 and 3. This consists simply of top and bottom halves 27 and 29 which are mirror images of each other and have side flanges 31 and 33, respectively, that are welded to each other to form the completed adapter. Each half is shaped to cover the two exhaust ports 3 at the inlet end of the adapter and to be joined to the single conduit 19' at the outlet end. A flange 11' is welded to the inlet end of the adapter 25 and has three holes 35 for bolts (not shown) to thread into holes 15 and secure the adapter in place.

The adapter 25 is relatively expensive to produce since the two halves must be press formed and then welded together along their edges. A major drawback of this construction is that separate tooling is needed for the top and bottom when the outlet end is skewed or non-symmetrical as it is in FIG. 2 and different tooling is required for each different angle of outlet offset. Since the volume of these systems that is sold is relatively small, the expense of separate tooling is reflected in the cost of each system.

DESCRIPTION OF THE INVENTION

According to the present invention the two pipes 7 and 9 and the two halves 27 and 29 are replaced by a one piece body that starts out as a flat round metal bland or disc 41 as shown in FIG. 4 that may be punched out of flat sheet stock. As a first stage of forming, the blank 41 is drawn into a cup 43 of circular cross section with an axial cross section as shown in FIG. 5. As a second stage of forming, the cup 43 is drawn into a cup 45 of circular cross section with an axial cross section as shown in FIG. 6. The second draw cup 45 preferably has a spherical bottom as shown at 47. As a third stage of forming, a part of the bottom 47 is pierced and extruded to form a collar 49, as shown in FIG. 7, turning the cup 45 into the shell 51. In FIG. 7 the collar is coaxial with the shell but in FIG. 8, the same stage is illustrated wherein the collar 49' is offset or skewed so that its axis 53 extends at an angle to the axis 55 of the shell 51' and, preferably, intersects the shell axis 55 at a plane 57 that marks the beginning of curvature of the spherical bottom portion 47'. The spherical bottom 47 of the cup 45 makes it comparatively easy to pierce and extrude the collar 49' at various angles as desired.

The shells 51 or 51' form the basic shells which are then shaped, respectively, into a unique body 59 (FIG. 11) or 59' (FIG. 14) by forming apparatus 61 such as illustrated in FIGS. 9 and 10. The ends 63 of the shell or 63' of the shells 51 and 51', respectively, are shaped by this apparatus to fit neatly over and around the two ports 3 and thus each comprises the inlet end of its respective body 59 or 59'. The collars 49 or 49' of the shells 51 and 51' are maintained by the apparatus 61 in substantially the same shape and orientation with respect to the rest of the body as they have in FIGS. 7 and 8, respectively, and each comprises the outlet end of its respective body 59 or 59'.

The apparatus 61 includes a spindle 65 that is supported on a linearly movable carrier 67 which during forming operation of the apparatus moves in the direction shown by arrow A. Its function is to locate the shell 51 or 51' and to prevent distortion of the collars 49 or 49' or disorientation thereof during the change in shape of the rest of the shell. The precise location and positioning of the spindle 65 is adjustable so that it fits either shell 51 or shell 51' or modifications wherein the collar 49' is offset or skewed on other angles as desired.

The apparatus 61 also includes a forming die 69 that is fixed on the bed 71 of a press 73 and a movable forming die 75 that is secured to the ram 77 of the press 73 to move in the direction shown by arrow B during the forming operation.

The apparatus 61 further includes a pair of circular, uniform diameter, identical mandrels 79 and 81 that project cantilever style from a linearly movable carrier 83 which moves in the direction of the arrow C during the forming operation. The carrier 83 and the spindle carrier 67 are attached through linkage (not shown) to the press so that the rate of their downward movement (A and C) is one half that of the ram and die 75 (B). The overall width of the two mandrels 79 and 81 is substantially the same as the inside diameter of the shell 51 as can be seen in FIG. 10. Their effective length, i.e., the length within the shell 51, is approximately one half or a little less than that of the overall length of the shell. The lengths of the fixed die 69 and the movable die 75 are coextensive with that of the mandrels but they are located so that their midplanes substantially coincide with the midplane of the shell 51 thereby locating them midway between the mandrels 79 and 81. The facing sides 85 and 87, respectively, of the fixed die 69 and the ram die 75 are semi-circular and cylindrical in shape with substantially the same radii and this radius is, in the particular case illustrated, somewhat less than the one half the spacing between the centerlines or axes of the mandrel.

Thus, when the ram 75 is moved toward the fixed die 69 at twice the speed of movement of the carriers 67 and 83 the result is formation of the body 59 (or 59') which is substantially symmetrical about the horizontal midplane of the shell 51 and mandrels 79 and 81. The inlet end of the body is shaped into a substantially FIG. 8 cross section because the effect of the dies 69 and 75 in combination with the mandrels 79 and 81, and their relative rates of movement, is to wrap the metal around most of the circumferences of each of the mandrels leaving a spaced section 89 that is reflected in exterior cleavages 91 and 93 between circular, partly cylindrical portions 95 and 97 corresponding to the mandrels 79 and 81. This general structure extends over approximately the inlet half of the body 59 (or 59').

The ends 99 and 101 of the fixed die 69 and the ram die 75 extend slightly beyond the ends of the mandrels 79 and 81, and are rounded and tapered to form rounded, tapered depressions 103 and 105 that are in the outlet half of the body. They blend the inlet cleavages 91 and 93 and inlet cylindrical portions 95 and 97 into the outer half end portions 107 and 109 and side portions 111 and 113, permitting the metal to flow in a natural way to minimize residual stress or fracture. The cross sectional shape of the outlet half of the body 59 (and body 59') is substantially oval, as can be seen best in FIG. 12 (or FIG. 15 for body 59'), in contrast to its originally circular shape as shell 51 (or 51') and to the still circular shape of the outlet collar 49 (or 49'). The interior of the body is a chamber 115 that is fed gas from the two inlets 117 and 119 (i.e., the extreme ends of the cylindrical portions 95 and 97) and discharges gas into the outlet 49 which in turn passes it on to the exhaust conduit 19 that may be welded to the end of the collar 49 as seen at 121.

In order to form a completed coupling device or adapter 123, a flange 125 (corresponding to flanges 11 and 11') is welded to the inlet end of the body 59 in a gas tight joint as indicated by the weld 127, (FIGS. 16 and 18). The exact shape of the mounting flange can vary as indicated by the modified form 129 (FIG. 15, in phantom lines), the two hole form 129' in phantom lines in FIG. 12, and the form 131 in FIG. 19. However, in these forms two round inlet holes 133 to fit over exhaust ports 3 are punched out of the plate from which the flange is formed, the body 59 (or 59') being butted against the outer side of the plate and welded to it as seen in FIG. 18. Each of the flanges is provided with bolt receiving holes 135 to match the holes 15 or their equivalents in any other specific application.

Figure 21:
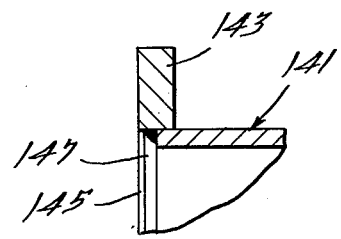
FIG. 21 is a cross section along the line 21—21 of FIG. 20.
Figure 22:
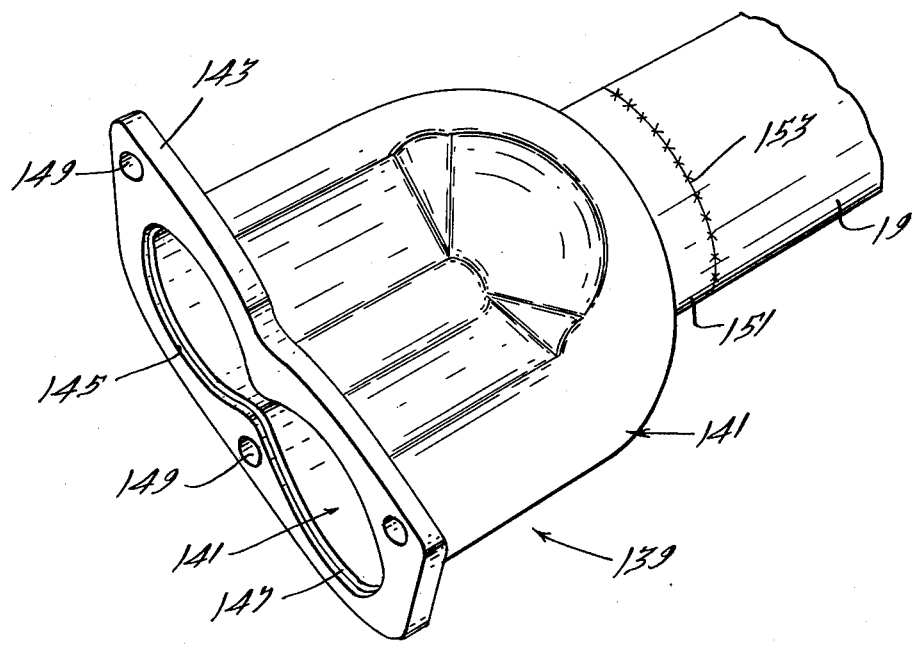
FIG. 22 is a perspective view of the coupling device of FIG. 20.

FIGS. 20–22 illustrate a coupling device 139 with a body 141 that is substantially the same as body 59 but its connection to the mounting flange 143 is different than shown for device 123. In this alternative form the flange 143 has a FIG. 8 opening 145 punched through it and the FIG. 8 inlet end of the body 141 is fitted inside of the opening and joined to it in a weld as seen at 147. The flange 143 has bolt holes 149 and the outlet collar 151 of the body 141 is welded at 153 to the conduit 19 so it will be seen that the device is otherwise substantially the same as those previously described.

Modifications may be made without departing from the spirit and scope of the invention

I claim:

1. A fluid flow coupling device for connecting a pair of ports in a manifold or the like to a single port comprising a body having a longitudinal axis and open at opposite ends to provide first and second open ends for the flow of fluid into one of said open ends and out of the other of said open ends, an attachment plate affixed to the body at the first end and adapted to be attached to said manifold and having an opening means therein in alignment with said pair of ports so that said body is in fluid flow communication with said ports, said body being formed of a single piece of drawn sheet metal and characterized by the absence of one or more longitudinally extending joints therein and having a first portion extending longitudinally from said first end over a substantial length of the body and a second portion extending longitudinally from said first portion over the remaining length of the body to said second end, said first end and said first portion of the body being shaped to have a cross section that is substantially a FIG. 8 in configuration with the loop portions of the 8 spaced apart to be in substantial alignment respectively with said pair of ports, the second end of the body being substantially circular in cross section, the second portion of said body gradually changing in cross sectional shape from said circular second end to a substantially oval cross section and then merging into the FIG. 8 cross section of the first portion.

2. A device as set forth in claim 1 wherein said second end is in the form of a cylindrical collar of circular cross section.

3. A device as set forth in claim 1 wherein the first end of the body butts against said plate and is welded thereto.

4. A device as set forth in claim 1 wherein the first end of the body fits inside the opening means of said plate and the body is welded to the plate.

5. A device as set forth in claim 1 wherein said second end is coaxial with the longitudinal axis.

6. A device as set forth in claim 1 wherein said second end is oblique with respect to said longitudinal axis.

7. A device as set forth in claim 1 wherein said FIG. 8 end is the inlet end of the coupling and said circular end is the outlet end of the coupling.

* * * * *